United States Patent [19]

Anders et al.

[11] 4,269,085
[45] May 26, 1981

[54] DRIVE MEANS FOR A CASCADE EXTRUDER

[75] Inventors: Dietmar Anders; Wilhelm Brand, both of Hanover, Fed. Rep. of Germany

[73] Assignee: Hermann Berstorff Maschinenbau GmbH, Hanover Kleefeld, Fed. Rep. of Germany

[21] Appl. No.: 948,095

[22] Filed: Oct. 2, 1978

[30] Foreign Application Priority Data

Oct. 1, 1977 [DE] Fed. Rep. of Germany ....... 2744337

[51] Int. Cl.³ ............................................. F16H 37/06
[52] U.S. Cl. .................................. 74/665 GA; 74/675
[58] Field of Search ............ 74/665 G, 665 GA, 675, 74/681, 661, 689; 425/131, 131.1, 132, 145, 147; 72/262

[56] References Cited

U.S. PATENT DOCUMENTS

| | | | |
|---|---|---|---|
| 1,905,114 | 4/1933 | Lauterbur et al. | 74/665 GA |
| 2,397,587 | 4/1946 | Armantrout | 74/665 GA X |
| 2,745,297 | 5/1956 | Andrus | 74/675 X |
| 3,359,826 | 12/1967 | Hanslik | 74/665 GA |
| 3,891,365 | 6/1975 | Fischer | 425/131.1 |
| 3,894,725 | 7/1975 | Schaf*r | 74/665 GA X |

FOREIGN PATENT DOCUMENTS 1375237 11/1974 United Kingdom.

Primary Examiner—C. J. Husar
Assistant Examiner—Frank McKenzie
Attorney, Agent, or Firm—Schwartz, Jeffery, Schwaab, Mack, Blumenthal & Koch

[57] ABSTRACT

Drive means for two screw extruders combined in a cascade arrangement wherein, instead of providing a drive motor and reduction gear for each screw, both screws are driven from the same drive motor and reduction gearing and a coupling gearing is included between the reduction gearing and one of the screws to enable different speed ratios of the two screws to be obtained. The coupling gearing may be shift gearing including pair of gears of different ratios alternatively and selectively included in the drive train to one of the screws by means of respective clutches. In another embodiment the coupling gearing includes a planet gearing with a ring gear of the planet gearing drivable by an electric motor to vary the speed of an output gear coupled to planet wheels compared to the speed of an input sun gear driven from the reduction gearing. A further embodiment has the planet gears connected to an output shaft, a ring gear connecting the planet gearing to the reduction gear and the sun gear connected to control gearing powered from the reduction gearing and controllable to vary the speed of the output shaft.

6 Claims, 6 Drawing Figures

DRIVE MEANS FOR A CASCADE EXTRUDER

The invention relates to a drive means for two screw extruders combined in a cascade arrangement including a drive motor to drive the screw shaft of one stage of the extruder through reduction gearing.

In cascade extruders it has been previously proposed to provide each of the individual extruders with a respective drive means to impart rotary movement to its screw shaft. By the provision of respective drives, that one of the screw extruders which forms the second stage of the cascade and is the discharge extruder, may be operated at varying speeds. By setting the most favourable speed ratio between the two stages of the cascade, good adaptation can be obtained to the various tool resistances and to the required extrusion pressures and other parameters of the process. The provision of separate drive means, for example each comprising a powerful electric motor, is however expensive.

According to the invention there is provided drive means for two screw extruders combined in a cascade arrangement, comprising a drive motor acting through reduction gearing on a screw shaft of one stage of the extruder and through coupling gearing on a screw shaft of the other stage of the extruder, the coupling gearing being connected to the reduction gearing and being such that the speed of the screw shaft of said other stage of the extruder can be varied, thereby to obtain different speed ratios between the screw shaft of said one stage and the screw shaft of said other stage of the extruder.

Thus only one powerful drive motor and only one reduction gearing is required to drive a cascade extruder. This can obviously result in a considerable reduction in technical outlay.

The coupling gearing connected to the reduction gearing can be a shift gearing. Preferably the shift gearing comprises two gear wheels mounted on an intermediate shaft and each meshing with a respective opposed gear wheel mounted on an extended drive shaft of the screw shaft of said other stage of the extruder, said two gear wheels or the opposed gear wheels can be selectively drivably coupled to the shaft on which they are mounted by clutch means and the transmission ratios of the two pairs of meshing gear wheels differ one from the other.

By coupling through one or other of the pairs of gear wheels, the drive shaft of the discharge extruder forming said other stage of the cascade can be driven with alternative, different speed ratios to said one stage in the cascade.

The coupling gearing can be planet gearing connected between the screw shafts of the two stages in the cascade. It receives the main driving power from the reduction gear in a fixed ratio and can be acted on by additional means to vary the output speed of the planet gearing.

A rotary movement is superimposed on the planet gearing, so that the speed ratio of the screw shafts of the two stages in the cascade can be varied. The conveying power can thus be adapted to the extruding pressure according to the moulding tool being used.

A sun wheel of the planet gearing is advantageously driven in a fixed ratio by the reduction gearing and a ring gear of the planet gearing is coupled to an additional motor the speed of which is preferably steplessly adjustable.

The superimposed rotary movement which is applied to the ring gear requires only low driving power but can enable the speed ratio of the screw shafts of the two stages in the cascade to be varied infinitely.

The additional motor is desirably constructed so that the ring gear can be driven in either direction of rotation.

In a modified form of the planet gearing, the ring gear thereof is driven in a fixed speed ratio to the drive shaft of said one stage in the cascade. The sun wheel of the planet gearing can be driven by a steplessly adjustable control gearing, which is driven from the reduction gearing, only low power being required to drive the sun wheel.

The invention can make it possible to choose a speed ratio between the two stage of the cascade, which will be most favourable for the conditions of the current process.

The invention is diagrammatically illustrated by way of example with reference to the accompanying drawings, in which.

Figure 1:
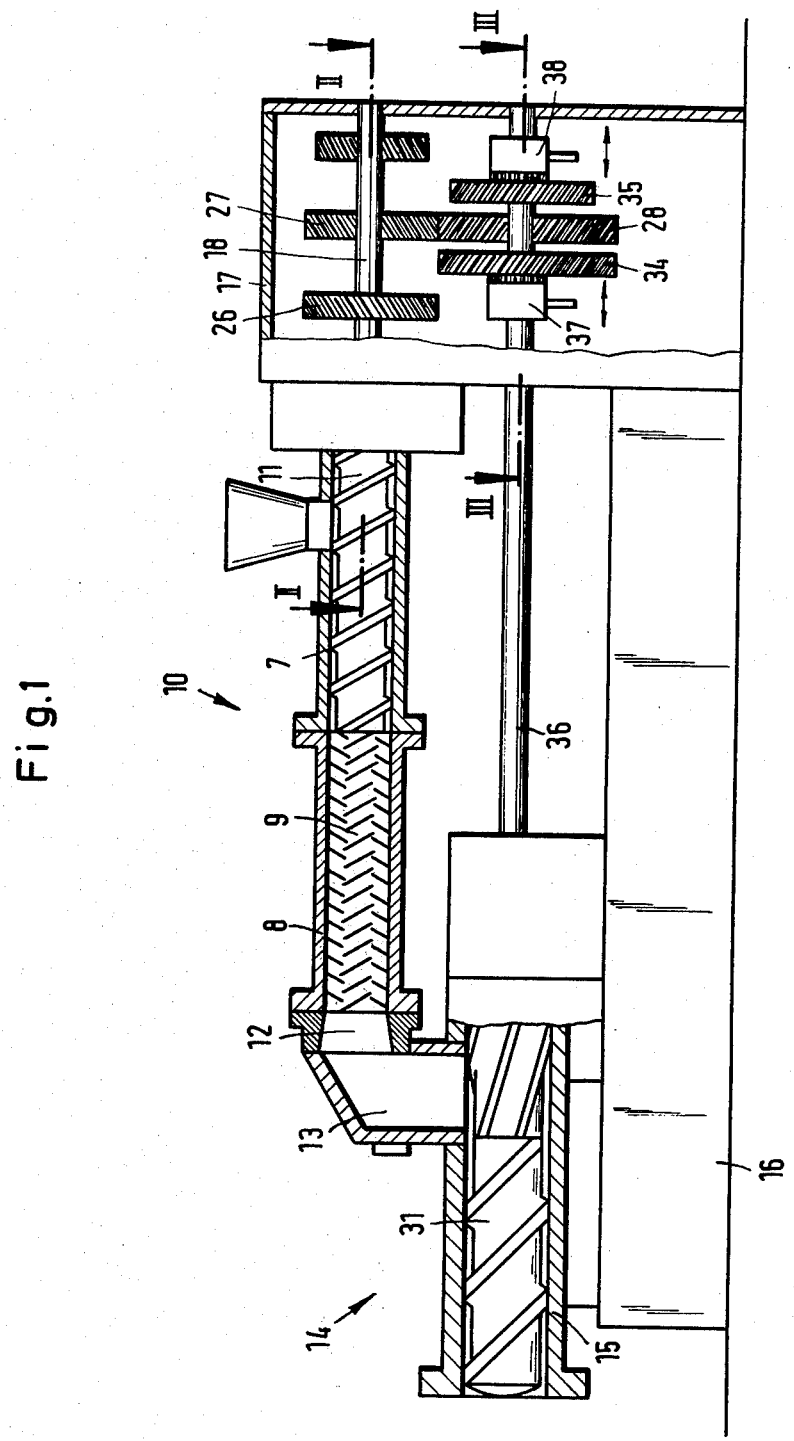
FIG. 1 is a longitudinal section through part of a first embodiment of drive means for a cascade extruder according to the invention, taken along line I—I of FIG. 2.
Figure 2:
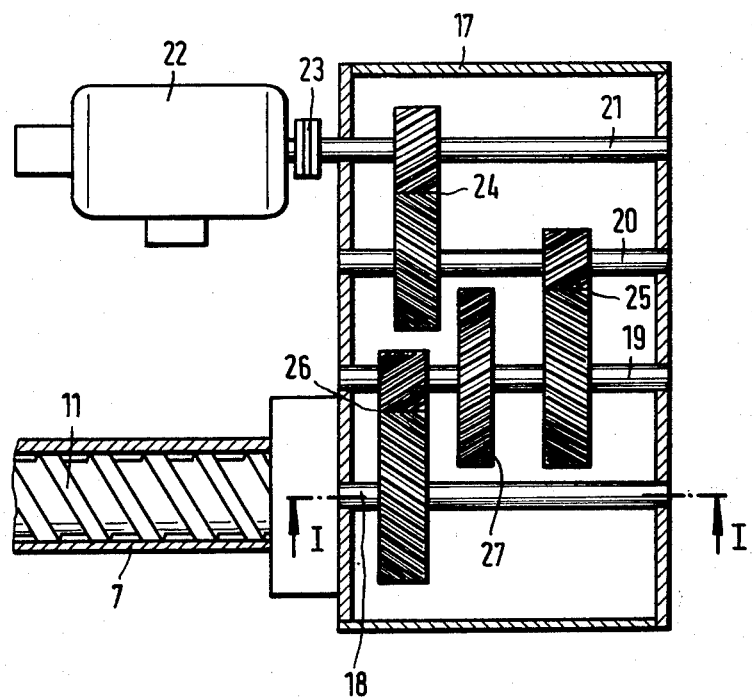
FIG. 2 is a sectional plan view taken in the plane of line II—II of FIG. 1.
Figure 3:
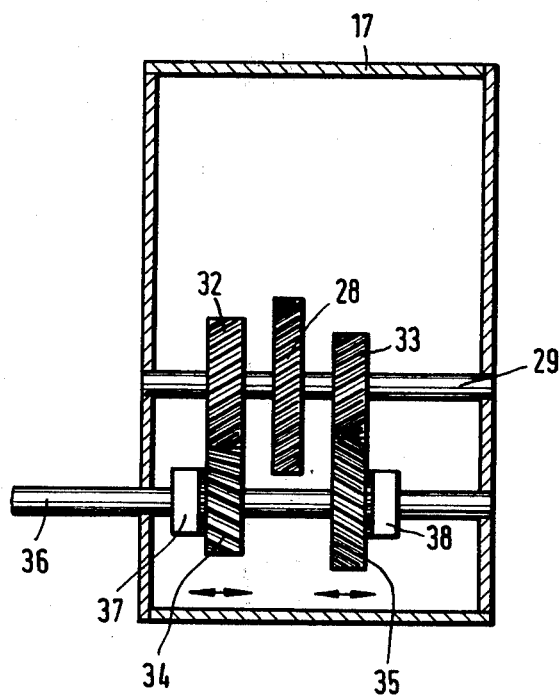
FIG. 3 is a sectional plan view taken in the plane of line III—III of FIG. 1.

Referring to the drawings and firstly to FIGS. 1 to 3, a first stage 10 in the cascade of the cascade extruder has a charging screw portion 7 with a downstream planet roller portion 8. The function of the first stage 10 is to pre-plasticise the material being processed. A central spindle 9 of the planet roller portion 8, which is indicated diagrammatically, is non-rotatably connected to a charging screw 11 of the portion 7. A chute 13 is mounted at the outlet 12 from the first stage 10 of the cascade, and directs moulding material into the intake region of a second stage 14. The second stage 14 of the cascade has a discharge extruder 15, and a moulding implement may be flanged to the downstream end of this.

The cascade extruder is mounted on a bed 16 and has a gear box 17 at its right hand end as viewed in FIG. 1. The charging screw 11 of the portion 7 has an extension forming a drive shaft 18, which passes through the gear box 17. It will be seen from FIG. 2 that three further shafts 19, 20 and 21 carrying gear wheels are located in the gear box 17, disposed parallel with the drive shaft 18 of the screw 11 and in the same horizontal plane. The rearmost shaft 21 is driven by a D.C. motor 22, the speed of which is steplessly adjustable, through a coupling 23. The rotary movement of the motor 22 is transmitted, via a three stage reduction gearing 24, 25 and 26, to the drive shaft 18 of the screw 11. The intermediate shaft 19 also has an intermediate gear 27 secured thereon. The gear 27 meshes with a further intermediate gear 28 secured on a shaft 29 which extends parallel with and in the same vertical plane as the intermediate shaft 19 (FIG. 3). Gear wheels 32 and 33 have different numbers of teeth and are both secured on the shaft 29. The gear wheels 32 and 33 mesh respectively with gear wheels 34 and 35, which are secured on an extended drive shaft 36 of a screw shaft 31 of the second stage 14 of the cascade. The gear wheel 34 or the gear wheel 35 can be coupled alternatively to the extended drive shaft 36 by means of optionally engageable respective clutches 37 and 38. The rotary movement provided by the D.C. motor 22 can thus be transmitted with a determined but optional reduction to the screw shaft 36 of the second stage 14 of the cascade.

The drive means here described has only two shifting steps 32, 34 and 33, 35 enabling two different speed ratios to be set between the two stages 10 and 14 of the cascade. However, it is also possible to provide additional shifting steps.

Figure 4:
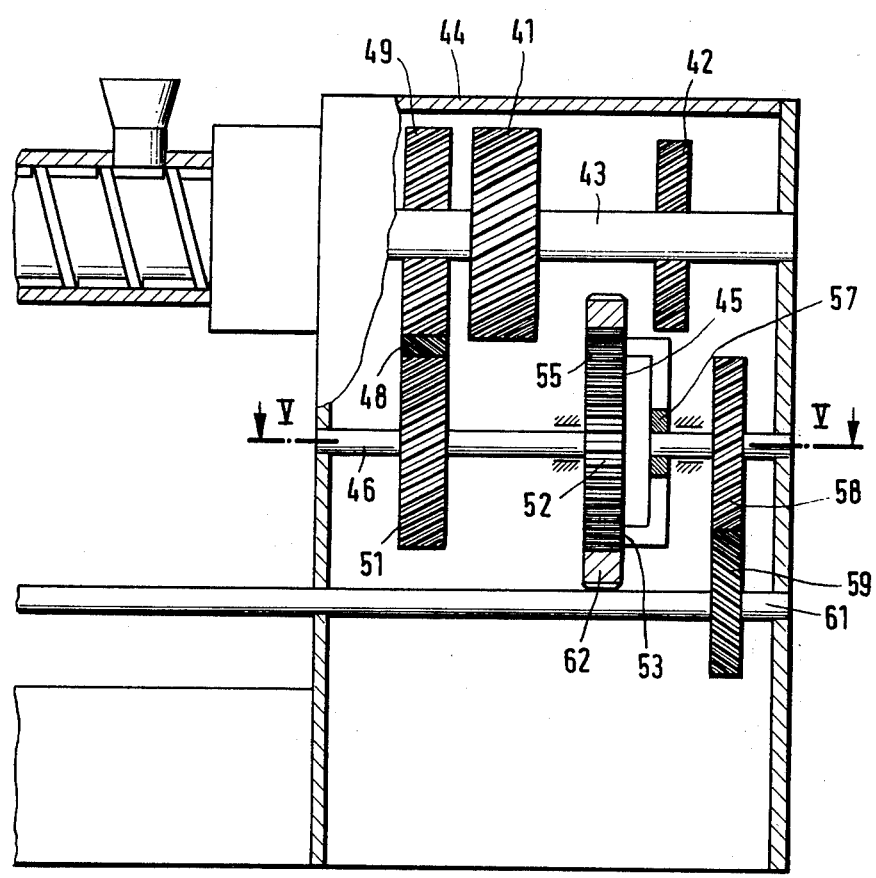
FIG. 4 is a sectional elevation through a second embodiment of drive means for a cascade extruder according to the invention, taken on line IV—IV of FIG. 5.
Figure 5:
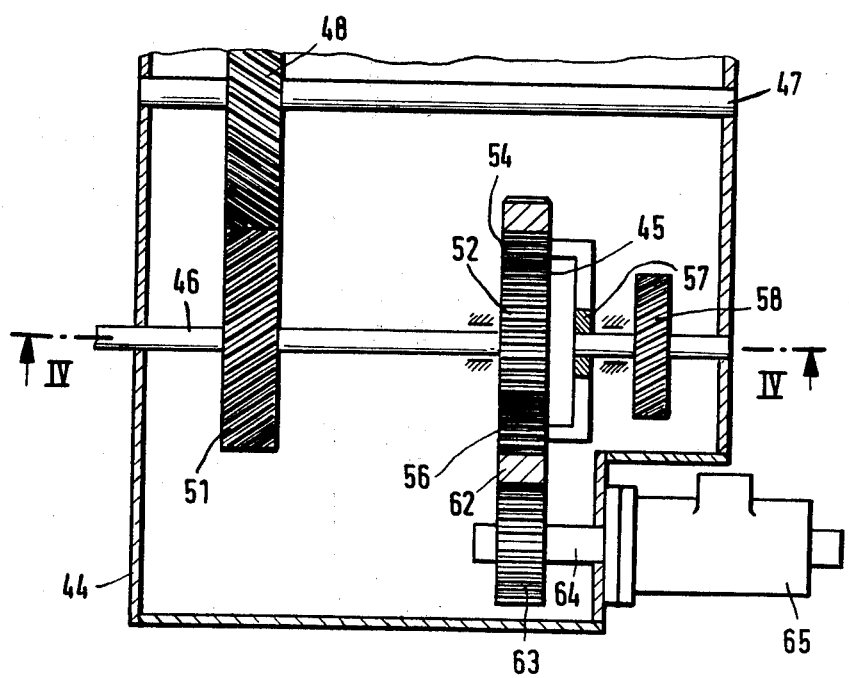
FIG. 5 is a sectional plan view taken in the plane of line V—V of FIG. 4.

The embodiment of drive means for a cascade extruder shown in FIGS. 4 and 5 again has a D.C. motor (not shown) which rotates a drive shaft 43 of a first stage of the cascade via reduction gearing 41, 42. Below the drive shaft 43 of the first stage of the cascade, a shaft 46 is rotatably mounted in the gear box 44 and carries a planet gearing 45. A further shaft 47 is rotatably mounted in the same horizontal plane as the shaft 46 and has an intermediate gear wheel 48 secured thereon. The gear wheel 48 meshes with a gear wheel 49 which is secured on a shaft of the reduction gearing 41, 42. The gear wheel 48 also meshes with a driving gear 51 on the shaft 46, which shaft 46 thereby drives a sun wheel 52 of the planet gearing 45. Four planet wheels 53 to 56 orbit around the sun wheel 52, and their mounting cage 57 acts on a pair of gears 58, 59 to drive an extended drive shaft 61 of the second stage of the cascade. The planet wheels 53 to 56 at the same time circle around the inside of an internally toothed ring gear 62, which also has external teeth. A pinion 63 on a power take-off journal 64 of a D.C. motor 65, the speed of which is steplessly adjustable, engages with the external teeth of the ring gear 62. The motor 65 can drive the pinion 63 and thus the ring gear 62 at various desired speeds. There is also a free choice of their rotary direction. Thus any speed ratio can be set between the two stages of the cascade.

Figure 6:
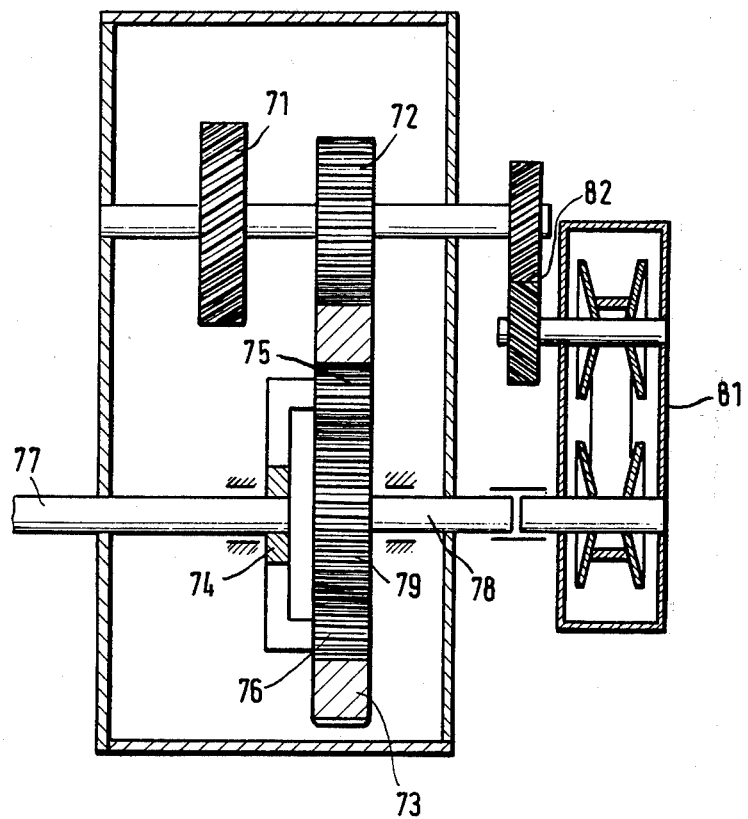
FIG. 6 is a sectional plan view of planet gearing of a third embodiment of drive means for a cascade extruder according to the invention.

FIG. 6 shows an embodiment of drive means for a cascade extruder with a planet gearing, in which the main driving power is imparted to the planet gearing in a different way. The main driving power is transmitted from a reduction gearing, in a fixed speed ratio, to an externally toothed ring wheel 73 of a planet gearing via appropriate gear wheels 71, 72. A cage 74 mounting planet wheels 75, 76 is coupled directly to an extended drive shaft 77 of the second stage of the cascade. A steplessly variable control gearing 81 is provided upstream of a drive journal 78 of a sun wheel 79 and is driven by a branch of the reduction gearing via a further gear wheel step 82. The speed of the sun wheel 79 can be steplessly varied by adjusting the control gearing 81. The power take-off speed of the planet gearing can thus be varied to suit current extruding conditions as desired.

What is claimed is:

1. Drive means for two screw extruders combined in a cascade arrangement, comprising a drive motor acting through reduction gearing on a screw shaft of one stage of the extruder and through coupling gearing on a screw shaft of the other stage of the extruder, said coupling gearing including shift gearing comprising two gear wheels mounted on an intermediate shaft and respective opposed gear wheels meshing with said gear wheels and mounted on an extended drive shaft of said screw shaft of said other stage extruder, and clutch means for selectively and alternatively drivably coupling said two gear wheels and said opposed gear wheels to the shaft on which they are mounted, with the transmission ratios of the two pairs of meshing gear wheels differing one from the other, and means for operatively connecting said coupling gearing to said reduction gearing such that the speed of said screw shaft of said other stage of said extruder can be varied, thereby to obtain different speed ratios between said screw shaft of said one stage and said screw shaft of said other stage of the extruder.

2. Drive means for two screw extruders combined in a cascade arrangement, comprising a drive motor acting through reduction gearing on a screw shaft of one stage of the extruder and through coupling gearing on a screw shaft of the other stage of the extruder, and means for operatively connecting said coupling gearing to said reduction gearing such that the speed of said screw shaft of said other stage of said extruder can be varied, thereby to obtain different speed ratios between said screw shaft of said one stage and said screw shaft of said other stage of the extruder, wherein said coupling gearing comprises planet gearing connected between said screw shafts of the two stages of the extruder, said planet gearing receiving main drive power through said reduction gearing in a fixed ratio, and further means acting on said planet gearing for varying the output speed of said planet gearing, thereby varying the speed of said screw shaft of said other stage of the extruder.

3. Drive means as claimed in claim 2, wherein said planet gearing includes a sun wheel driven in a fixed ratio by said reduction gearing, said reduction gearing also driving said screw shaft of said one stage of the extruder, said planet gearing further including a ring gear driven by said further means, which comprises a separate motor.

4. Drive means as claimed in claim 1, wherein said separate motor is provided with means for steplessly adjusting the speed thereof.

5. Drive means as claimed in claim 1, wherein said separate motor is reversible whereby said ring gear can be driven in either direction of rotation.

6. Drive means as claimed in claim 2, wherein said planet gearing includes a ring gear driven by said reduction gearing in a fixed ratio to said screw shaft of said one stage of the extruder, and said further means comprises steplessly adjustable control gearing which is driven by said reduction gearing and which in turn drives a sun wheel of said planet gearing.

* * * * *